United States Patent
Osone et al.

(10) Patent No.: US 6,883,386 B2
(45) Date of Patent: Apr. 26, 2005

(54) ULTRASONIC FLOW RATE MEASUREMENT INSTRUMENT

(75) Inventors: Masami Osone, Tokyo (JP); Hironobu Yao, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/480,381
(22) PCT Filed: Jun. 6, 2002
(86) PCT No.: PCT/JP02/05565
§ 371 (c)(1),
(2), (4) Date: Dec. 11, 2003
(87) PCT Pub. No.: WO02/103300
PCT Pub. Date: Dec. 27, 2002

(65) Prior Publication Data
US 2004/0173029 A1 Sep. 9, 2004

(30) Foreign Application Priority Data
Jun. 13, 2001 (JP) ........................................ 2001-178233
Aug. 23, 2001 (JP) ........................................ 2001-253113

(51) Int. Cl.[7] ................................................ G01F 1/66
(52) U.S. Cl. ................................................ 73/861.25
(58) Field of Search ........................ 73/861.25, 861.23, 73/861.26, 861.28, 861, 18, 861.27

(56) References Cited
U.S. PATENT DOCUMENTS 4,425,803 A * 1/1984 Baumoel ................. 73/861.18
4,454,767 A * 6/1984 Shinkai et al. ........... 73/861.18
5,001,936 A * 3/1991 Baumoel ................. 73/861.18

FOREIGN PATENT DOCUMENTS

JP          61-133821        6/1986
JP          7-333021         12/1995

* cited by examiner

Primary Examiner—Edward Lefkowitz
Assistant Examiner—Takisha Miller
(74) Attorney, Agent, or Firm—Manabu Kanesaka

(57) ABSTRACT

It is an object to provide an ultrasonic flow amount measuring device in which a direction and position of a transducer can be accurately fixed, thereby improving workability such as a reduction in working time. In order to attain the object, ultrasonic transducers 20 are fixed with a proper interval therebetween using a positioning portion 41 attached to a positioning frame 40. The position adjustment of the wave transducer 20 is automatically carried out through a positioning spring 25b and the positioning portion 41. A guide frame 30 can be mounted at a proper position on a conduit pipe 10 irrespective of the installation of the wave transducer. The guide frame 30 is mounted without paying attention to an interval between the ultrasonic transducers and coating an acoustic coupling medium on the conduit pipe, so that selection of a setup place, etc. can be freely performed. After pre-assembly, the required acoustic coupling medium is coated on the wave ultrasonic transducers, and the positioning frame 40 is attached to the guide frame 30, so that the right directions and positions can be applied to the wave ultrasonic transducers.

11 Claims, 18 Drawing Sheets

ULTRASONIC FLOW RATE MEASUREMENT INSTRUMENT

TECHNICAL FIELD

The present invention relates to an ultrasonic flow amount measuring device. More particularly, the present invention relates to an ultrasonic flow amount measuring device having a conduit pipe in which fluid flows in one direction and a pair of ultrasonic transducers disposed on an outer surface of the conduit pipe at upstream and downstream sides thereof in one direction. In the ultrasonic flow amount measuring device, one of the ultrasonic transducers transmits an ultrasonic wave into the conduit pipe, and the other of the transducers receives the ultrasonic wave reflected at an inner surface of the conduit pipe. Each of the ultrasonic transducers is positioned correctly to provide a right direction so that an axis line of the conduit pipe is situated on a propagation plane containing a propagation path of the ultrasonic wave, thereby accurately measuring a velocity of the fluid flowing in the conduit pipe.

BACKGROUND OF THE TECHNICAL FIELD

FIG. 15 is a view for explaining the principle of the ultrasonic flow amount measuring device. In an ultrasonic flow amount measuring device 200 shown in FIG. 15, fluid to be measured flows in a direction indicated by an arrow FD in a conduit pipe 60. A pair of ultrasonic transducers 70 is disposed on an outer surface of the conduit pipe 60 with a predetermined distance therebetween. Each of the ultrasonic transducers 70 includes a vibrator 71 and a plastic wedge 72. An acoustically coupling medium 79 for acoustic matching is coated between the wedges 72 and the outer surface of the conduit pipe 60 to enhance propagation efficiency of the ultrasonic waves. An ultrasonic wave transmitted from one of the ultrasonic transducers is reflected at an inner surface of the conduit pipe 60, and received by the other of the ultrasonic transducers as indicated by a line with arrows shown in FIG. 15. A plane containing a propagation path of the ultrasonic wave is referred to as a propagation plane. The propagation plane corresponds to a sheet face of FIG. 15 containing an axis line of the conduit pipe 60.

When the ultrasonic transducers 70 are properly oriented and positioned so that the ultrasonic wave travels on the propagation plane, a time difference Δt in arrival times at the ultrasonic transducers (propagation time difference) of the ultrasonic wave traveling in a forward direction and a backward direction relative to the flowing direction is expressed as follows:

$$\Delta t = 2LV/c^2 \quad (1)$$

where V is a velocity of the fluid flowing in the conduit pipe 60, L is a length of the propagation path, and c is the speed of sound. From Equation (1), when the propagation time difference Δt is known from a measurement, the velocity of the fluid is determined. Also, when a cross-sectional area of the conduit pipe 60 is known, a flow rate of the fluid flowing through the conduit pipe is obtained.

FIG. 16 is a plan view showing an example of a conventional ultrasonic flow amount measuring device constructed on the basis of the above-described principle. FIG. 17 is an enlarged plan view showing a transducer shown in FIG. 16, and FIG. 18 is an enlarged front view showing a further detail of the transducer shown in FIG. 16. In the ultrasonic flow amount measuring device 201 shown in FIG. 16, a guide rail 80 is provided for linearly guiding a pair of ultrasonic transducers 70 parallel to an axial line of the conduit pipe 60. The guide rail 80 has two frames and is disposed parallel to the axial line of the conduit pipe 60. The guide rail 80 sandwiches the ultrasonic transducers 70 on side surfaces thereof from both sides. Both ends of the guide rail 80 are joined to saddles 81. The saddles 81 are secured to the outer peripheral surface of the conduit pipe 60 by belts 82 formed of metal or plastic.

The ultrasonic transducers 70 are linearly guided along the guide rail 80. The ultrasonic transducers 70 are positioned so that transmission/reception of the ultrasonic wave is carried out along the line RT with arrows shown in FIG. 15. As shown in FIG. 18, a positioning shaft 78 is vertically provided at a bottom surface of the seat 72 of each transducer 70. A screw member (not shown) having a cylindrical shape is provided to be coaxial with the positioning shaft 78, and has screw threads formed on inner and outer sides thereof. The screw thread on the outer side of the screw member engages a screw thread formed on an inner side of a position fixing screw 75. The screw thread on the inner side of the screw member engages a screw thread formed on an outer side of a height adjusting screw 76. When the position fixing screw 75 is rotated, the guide rail 80 is sandwiched by an upper surface of a plate member (not shown) connected to the bottom portion of the screw member and the lower surface of the position fixing screw 75. Accordingly, the ultrasonic transducers 70 are fixed so as not to move in the axial direction of the conduit pipe 60. When the height adjusting screw 76 is rotated, the transducer 70 moves upwardly and downwardly with respect to the screw member. Accordingly, in the fixing step, a distance between the ultrasonic transducers 70 is adjusted so that a cursor 85 attached to each of the ultrasonic transducers 70 is positioned at a specific position on a scale attached to the guide rail 80. Then, each of the ultrasonic transducers 70 is fixed at the position by the position fixing screw 75, and is closely attached to the upper surface of the conduit pipe 60 by the height adjusting screw 76.

In the above-described conventional device, it is necessary to accurately position the ultrasonic transducers with an appropriate distance therebetween to place the axial line of the conduit pipe on the propagation plane of the ultrasonic wave, so that the ultrasonic transducers precisely perform the transmission and reception of the ultrasonic wave along the line RT. In the conventional device, the distance between the ultrasonic transducers is adjusted by positioning the cursors attached to the ultrasonic transducers based on the scale attached to the guide rail. The ultrasonic transducers are fixed at the proper positions of the guide rail, and are closely attached to the upper surface of the guide pipe with the fixing screws and the height adjusting screws. Therefore, it is difficult to fix the ultrasonic transducers with high precision, thereby taking long time and requiring a skilled worker. Further, the acoustic coupling medium is coated on the ultrasonic transducers, and the guide rail is fixed on the outer surface of the conduit pipe with the belts while positioning. Accordingly, the fixing screws may be loosened to cause a displacement in the distance between the ultrasonic transducers. The acoustic coupling medium may be exfoliated or hardened, and the ultrasonic transducers may not closely contact the conduit pipe, thereby causing an adverse effect.

In view of the above problems, the present invention has been made, and an object of the present invention is to provide an ultrasonic flow amount measuring device in which each of the ultrasonic transducers can be accurately positioned with a right angle at a right position without difficulty, thereby improving workability and reducing a working time.

DISCLOSURE OF THE INVENTION

In order to achieve the above objects, according to first aspect, an ultrasonic flow amount measuring device includes a conduit pipe for allowing fluid to flow therein in one direction; a pair of transceivers disposed on an outer surface of the conduit pipe at upstream and downstream sides thereof in one direction for transmitting and receiving an ultrasonic wave propagating along a propagation path in the conduit pipe; and positioning mechanisms for positioning the transceivers with desired angles at desired positions so that an axial line of the conduit pipe is situated on a propagation plane containing the propagation path of the ultrasonic wave.

In the embodiment, the positioning mechanisms are provided for positioning the transceivers with a proper interval therebetween. When the transceivers are positioned properly, each of the transceivers is automatically fixed at a right position with a right angle.

According to the first aspect, the positioning mechanism may include a guide frame disposed on the outer surface of the conduit pipe for linearly guiding the transceivers in an axial direction of the conduit pipe; a positioning frame attached to the guide frame and having an outer edge with a saw-tooth shape aligned parallel to the axial line of the conduit pipe, and positioning means attached to each of the transceivers and having a positioning spring. A tip of the positioning spring engages the outer edge of the positioning frame, so that each of the transceivers is fixed at the right position with the right direction. The outer edge of the positioning frame has recess portions and projecting portions with a constant interval. Accordingly, when the tip of the positioning spring is fitted in one of the recess portions, the transceiver is positioned at one of positions with the constant interval (second aspect).

According to the first aspect, the positioning mechanism may include a guide frame disposed on the outer surface of the conduit pipe for linearly guiding the transceivers in the axial direction of the conduit pipe; a positioning portion integrated with the guide frame and having positioning holes with a constant interval aligned parallel to the axial line of the conduit pipe; and positioning means for fixing the transceivers with right directions at predetermined positions by using the positioning holes, thereby making the positioning mechanism simple (third aspect).

According to the first aspect, the positioning mechanism may include a guide frame mounted on the outer surface of the conduit pipe for linearly guiding the transceivers in the axial direction of the conduit pipe, and having plural positioning holes formed on a side surface thereof; and positioning means attached to the transceivers and having positioning projections. When each of the transceivers is mounted on the guide frame, the positioning projection is fitted into one of the positioning holes at a specific position, so that the transceiver is fixed at the right position with the right angle. Accordingly, when the transceiver with the positioning means is inserted into the guide frame mounted on the conduit pipe, it is possible to attach the transceiver to the guide frame through one-touch operation (fourth aspect).

According to the second to fourth aspects, the positioning means may include a spring member for pressing each of the transceivers against the conduit pipe with elastic force when the transceivers are mounted on the guide frame. In this case, it is not necessary to adjust the transceivers to closely contact the conduit pipe (fifth aspect).

According to the first to fifth aspects, the guide frame may be attachable to the outer peripheral surface of the conduit pipe in a step before a step of attaching the transceivers. Accordingly, it is possible to separately attach the transceivers to the guide frame without an effect of a position of an acoustic matching medium after the guide frame is attached, thereby reducing a working time.

DESCRIPTION OF REFERENCE NUMERALS

10 conduit pipe; 20 wave transducer; 25, 26, 27 positioning metal fitting; 25a, 26c press plate; 25b positioning spring; 26a press fitting; 26b fixing pin; 27a positioning projection; 27b slit; 28 positioning shaft; 28a E ring; 28b coil spring; 28c disc spring; 29 acoustic coupling medium; 30, 35 guide frame; 31 saddle; 32 belt; 35b graduations; 35a positioning hole; 40, 50 positioning frame; 41, 51 positioning portion; 43 fixing screw; 101, 102, 103 ultrasonic flow amount measuring device.

BEST MODES FOR CARRYING OUT THE INVENTION

Hereunder, an embodiment 1 of the present invention will be explained with reference to the accompanying drawings.

Figure 1:
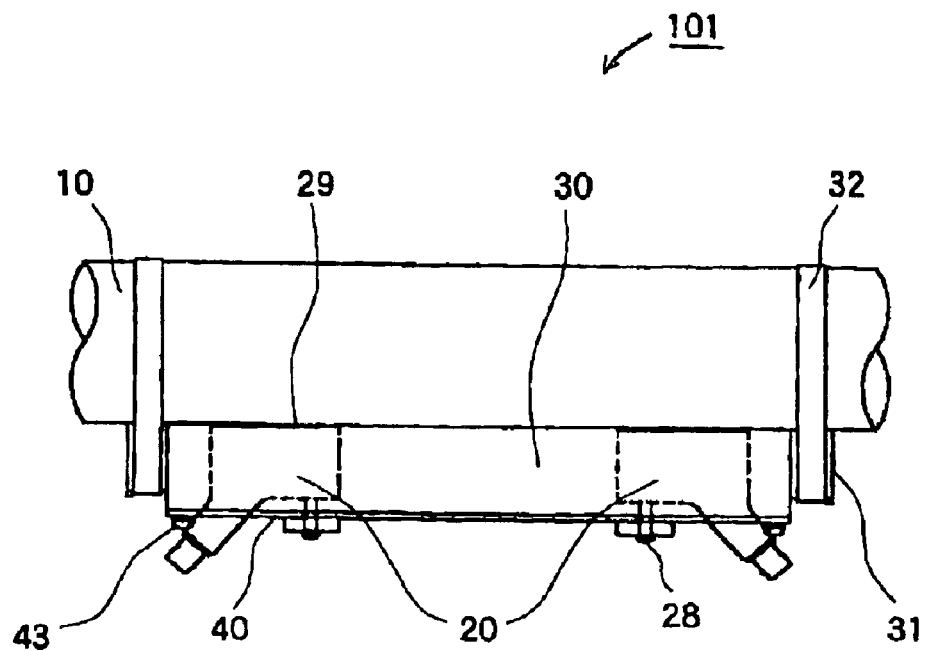
FIG. 1 is a front view showing an ultrasonic flow amount measuring device according to an embodiment 1 of the present invention.
Figure 2:
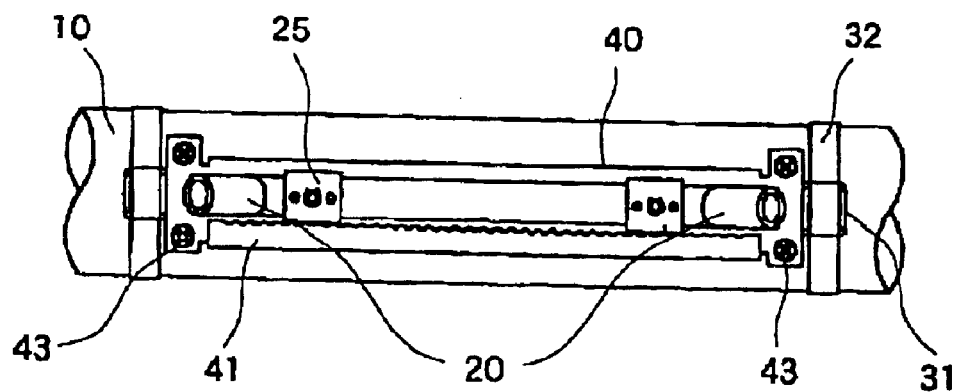
FIG. 2 is a bottom view of the ultrasonic flow amount measuring device shown in FIG. 1.
Figure 3:
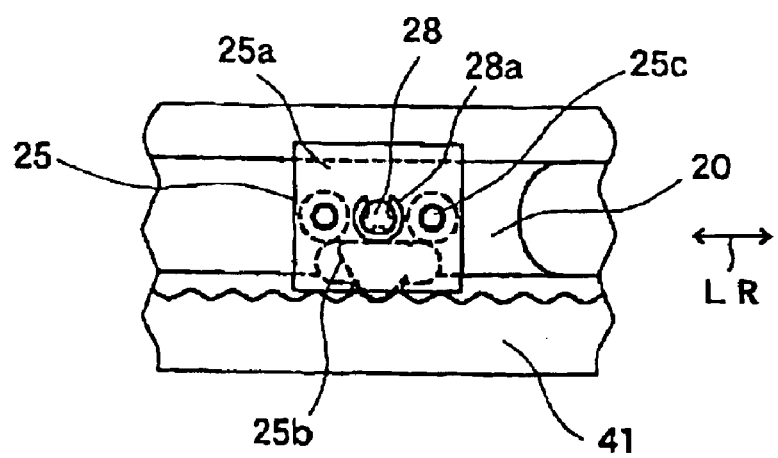
FIG. 3 is an enlarged view showing a detail around a positioning shaft of a transducer shown in FIGS. 1 and 2.
Figure 4:
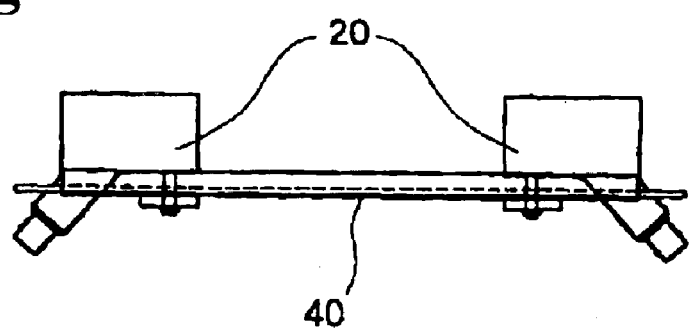
FIG. 4 is a view showing the ultrasonic transducers and a positioning frame of the ultrasonic flow amount measuring device shown in FIG. 1.
Figure 5:
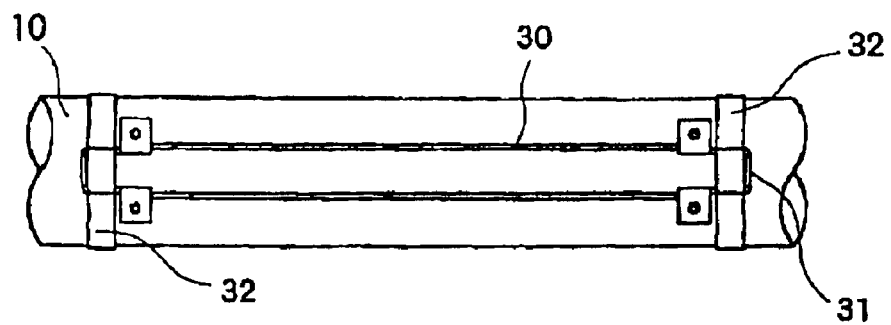
FIG. 5 is a view showing a guide frame and a conduit pipe of the ultrasonic flow amount measuring device shown in FIG. 1.

FIG. 1 is a front view showing an ultrasonic flow amount measuring device according to an embodiment 1 of the present invention. FIG. 2 is a bottom view of the ultrasonic flow amount measuring device shown in FIG. 1. FIG. 3 is an enlarged view showing a detail around a positioning shaft of a transducer shown in FIG. 1. FIG. 4 is a view showing the ultrasonic transducers and a positioning frame of the ultrasonic flow amount measuring device shown in FIG. 1. FIG. 5 is a view showing a guide frame and a conduit pipe of the ultrasonic flow amount measuring device shown in FIG. 1.

In an ultrasonic flow amount measuring device 101 shown in FIGS. 1 and 2, a conduit pipe 10 is formed in a cylindrical shape, and fluid to be measured flows through the conduit pipe 10. Ultrasonic transducers 20 are respectively disposed on the outer peripheral surface of the conduit pipe 10 at upstream and downstream sides thereof. An ultrasonic wave transmitted from one of the ultrasonic transducers 20 is reflected at an inner surface of the conduit pipe 10 and received by the other of the ultrasonic transducers 20. A guide frame 30 has a pair of plate members (see FIG. 5) disposed in parallel with an interval therebetween so that the ultrasonic transducers 20 are inserted between the plate members. End portions of the plate members are joined with each other and integrated with saddles 31. The saddles 31 are mounted on the outer peripheral surface of the conduit pipe 10 by belts 32. When the ultrasonic transducers 20 are inserted into the space between the plate members, the guide frame 30 sandwiches the ultrasonic transducers 20 from both sides so that the ultrasonic transducers 20 are linearly guided parallel to an axial line of the conduit pipe 10. A positioning frame 40 has a positioning member 41 having an outer edge formed in saw-teeth shapes (the positioning member 41 is preferably spot-welded on the positioning frame 40). The positioning member 40 is fixed to the guide frame 30 with fixing screws 43 after the positioning frame 40 is assembled with the ultrasonic transducers 20 (see FIG. 4).

A positioning metal fitting 25 is used for assembling each of the ultrasonic transducers 20. The positioning metal fitting 25 includes a press plate 25a attached to each of the ultrasonic transducers 20 and a positioning spring 25b attached to the press plate 25a. The positioning spring 25b engages proper saw-teeth portions of the positioning portion 41. Accordingly, when the positioning frame 40 assembled with the ultrasonic transducers 20 is attached to the guide frame 30, each of the ultrasonic transducers 20 is automatically fixed at a right position with a right direction. When the positioning frame 40 assembled with the ultrasonic transducers 20 is attached to the guide frame 30, the acoustic coupling medium 29 is coated on the surface of the conduit pipe 10 where the ultrasonic transducers 20 closely contact, thereby enhancing the propagation efficiency of the ultrasonic wave.

Figure 8:
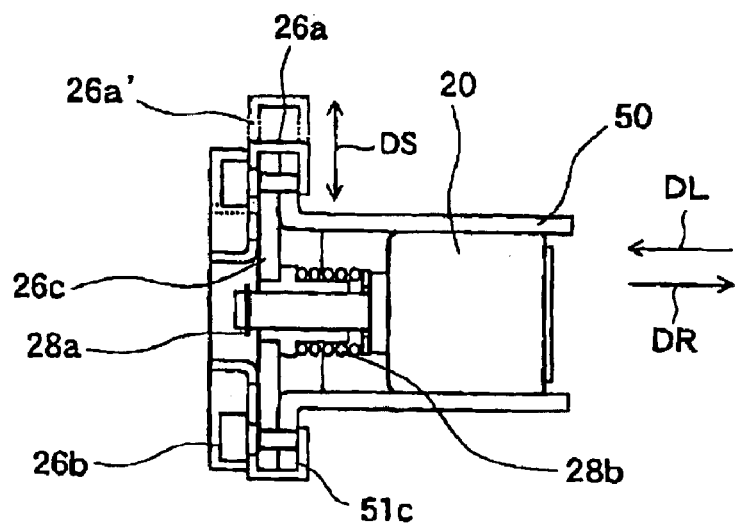
FIG. 8 is a sectional view taken along line X—X in FIG. 7.

A preferable specific arrangement of the assembly described above will be explained briefly. As shown in FIG. 3, the press plate 25a having the positioning spring 25b is attached to a support plate (not shown, disposed below the press plate 25a in FIG. 3) with two fixing screws 25c (see FIG. 3) to form the positioning metal fitting 25. A through hole is formed at a center of the positioning metal fitting 25 for inserting a positioning shaft 28 of each of the ultrasonic transducers 20. In the assembled state described above, the press plate 25a and the support plate sandwich an edge of the positioning frame 40, so that the positioning metal fitting 25 is slidable in the direction of an arrow LR. The positioning spring 25b engages the saw-teeth portions of the positioning portion 41. A coil spring (or disc spring) is mounted on the positioning shaft 28 of each of the ultrasonic transducers 20. The coil spring is positioned between the transducer 20 and the positioning metal fitting 25, and fixed with an E ring 28a so that the positioning shaft 28 does not come out of the positioning metal fitting 25 (similar arrangement is shown in FIG. 8). As described above, the ultrasonic transducers 20 are fixed to the positioning frame 40 with a right distance therebetween through the positioning portion 41 attached to the positioning frame 40. Accordingly, it is possible to adjust positions of the ultrasonic transducers 20 through the positioning springs 25b and the positioning portions 41 (in the sub-assembled state as shown in FIG. 4), thereby making the assembly secure and easy.

As shown in FIG. 5, the guide frame 30 is mounted on the conduit pipe 10 in an assembly step different from the step of attaching the ultrasonic transducers 20 to the positioning frame 40. When the guide frame 30 is mounted as shown in FIG. 5, the ultrasonic transducers 20 are not yet attached to the guide frame 30. Accordingly, it is not necessary to pay attention to the adjustment of the distance between the ultrasonic transducers 20, and to coat the acoustic coupling medium on the conduit pipe 10 as compared with the prior art. Therefore, it is possible to move and position the guide frame 30 at a desired position freely. The assembly work is divided in the two separate steps as described above. As a result, it is not necessary to have a skilled operator, and it is possible to reduce the number of the steps. After the guide frame 30 is mounted on the conduit pipe 10, the acoustic coupling medium is coated on bottom surfaces of the ultrasonic transducers assembled with the positioning frame 40. Then, the ultrasonic transducers 20 are inserted into the guide frame 30, and the positioning frame 40 is fixed with the fixing screws 43 to complete the assembly.

Figure 6:
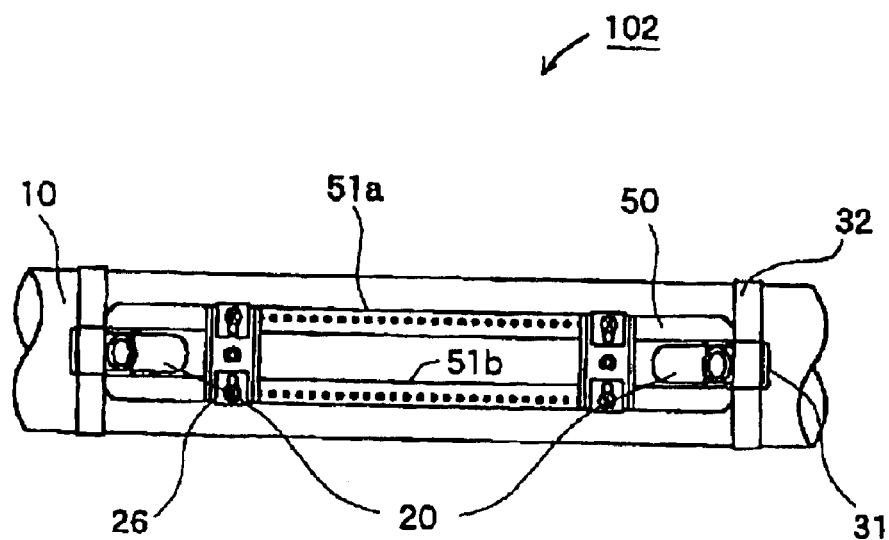
FIG. 6 is a plan view showing an ultrasonic flow amount measuring device according to an embodiment 2 of the present invention.
Figure 7:
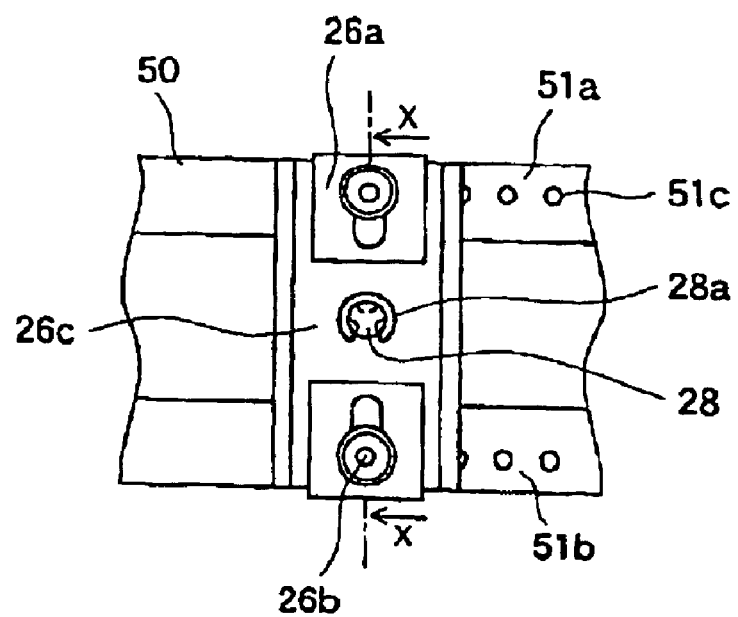
FIG. 7 is an enlarged view showing a detail around a positioning shaft of a transducer shown in FIG. 6.

An ultrasonic flow amount measuring device according to an embodiment 2 of the present invention will be described next with reference to FIGS. 6 to 8. FIG. 6 is a plan view showing an ultrasonic flow amount measuring device according to the embodiment 2 of the present invention. FIG. 7 is an enlarged view showing a detail around a positioning shaft of a transducer shown in FIG. 6. FIG. 8 is a sectional view taken along line X—X in FIG. 7.

An ultrasonic flow amount measuring device 102 shown in FIG. 6 has the pair of the ultrasonic transducers 20, and a guide frame 50 for guiding the ultrasonic transducers 20. The conduit pipe 10 is formed in a cylindrical shape, and fluid to be measured flows inside the conduit pipe 10. The ultrasonic transducers 20 are disposed on the outer peripheral surface of the conduit pipe 10. The guide frame 50 has a pair of guide plate portions facing with each other and arranged in parallel for linearly guiding each of the ultrasonic transducers 20. Upper end edges of the guide plate portions are bent at right angle so as to be on the same plane, and a plurality of positioning holes 51c is formed in a row in the guide plate portions to form positioning portions 51a and 51b. The positioning holes 51c of the positioning portions 51a and 51b are formed symmetrically with respect to the centerline of the guide plate portions, and are arranged with a specific pitch. Ends of the guide frame 50 are joined to the saddles 31, and the saddles 31 are fixed to the conduit pipe 10 with the belts 32. The ultrasonic transducers 20 are mounted on the conduit pipe 10, and the contacting surfaces thereof are coated with the acoustic coupling medium.

Figure 9:
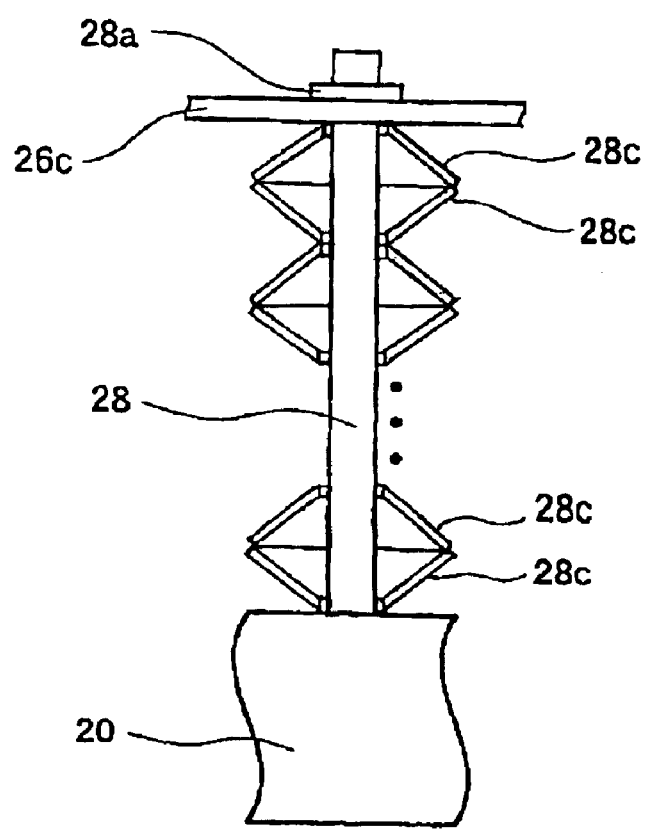
FIG. 9 is a view showing a case where a disc spring is used in place of a coil spring shown in FIG. 8.

A process of assembling the ultrasonic flow amount measuring device 102 will be described next. First, the guide frame 50 is attached to the conduit pipe 10 with the belts 32. Separately from this step, a coil spring 28b and a press plate 26c are attached to the positioning shaft 28 of each of the ultrasonic transducers 20 with an E ring 28a so as not to come out of the positioning shaft 28. Presser metal fittings 26a of a positioning metal fitting 26 are fixed to the press plate 26c with press fitting fixing pins 26b. The presser metal fittings 26a are slidable in an arrow direction DS shown in FIG. 8. The presser metal fittings 26a move to open outwardly in the arrow direction DS (state shown by 26a'). The acoustic coupling medium 29 is coated on the bottom surfaces of the ultrasonic transducers 20. The ultrasonic transducers 20 are then inserted into the guide plate portions of the guide frame 50 attached to the conduit pipe 10. The press plate 26c is placed on the positioning portions 51a and 51b. Tip portions of the fixing pins 26b fitted in the press plate 26c are matched to proper ones of the positioning holes 51c. The presser metal fittings 26a are moved to close inwardly in the arrow direction DS, and are fixed to the guide frame 50. In place of the coil spring 28b shown in FIG. 8, disc springs 28c shown in FIG. 9 may be used.

In the ultrasonic flow amount measuring device 102 described above, the press plates 26c elastically press the ultrasonic transducers 20 against the outer peripheral surface of the conduit pipe 10 along with the coil springs 28b mounted on the positioning shafts 28. It is possible to position the ultrasonic transducers 20 at the right positions with the right directions with the press plates 26c and the positioning portions 51a and 51b. With the arrangement described above, as compared with the ultrasonic flow amount measuring device 101 shown in FIG. 1, in the ultrasonic flow amount measuring device 102 according to this embodiment, the two components, i.e. the guide frame 30 and the positioning frame 40 shown in FIG. 1, are substantially replaced with one component, i.e. the guide frame 50, thereby reducing the expensive component. The positioning springs 25b are also eliminated, thereby further reducing a cost. Similar to the ultrasonic flow amount measuring device 101 shown in FIG. 1, the assemble work is divided to achieve the advantages described above.

Figure 10:
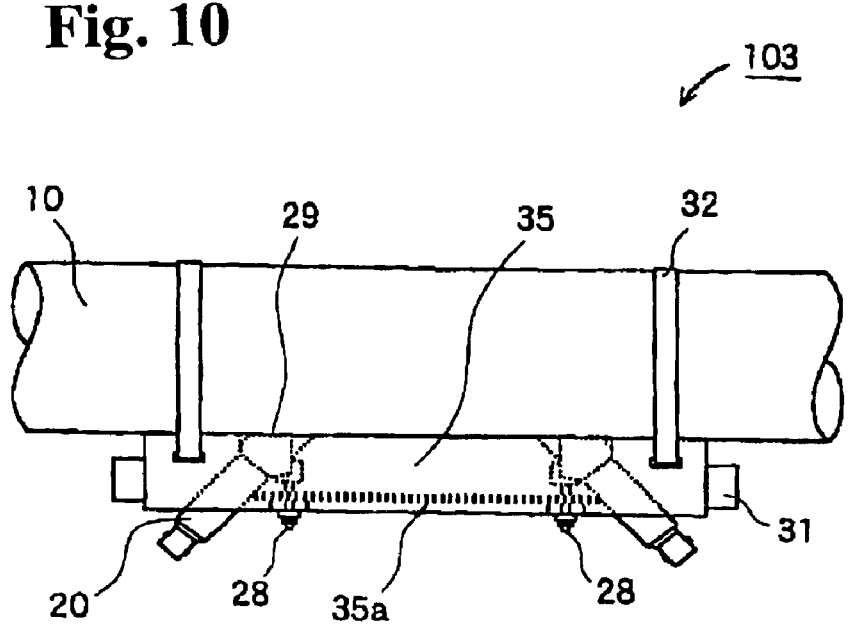
FIG. 10 is a front view showing an ultrasonic flow amount measuring device according to an embodiment 3 of the present invention.
Figure 11:
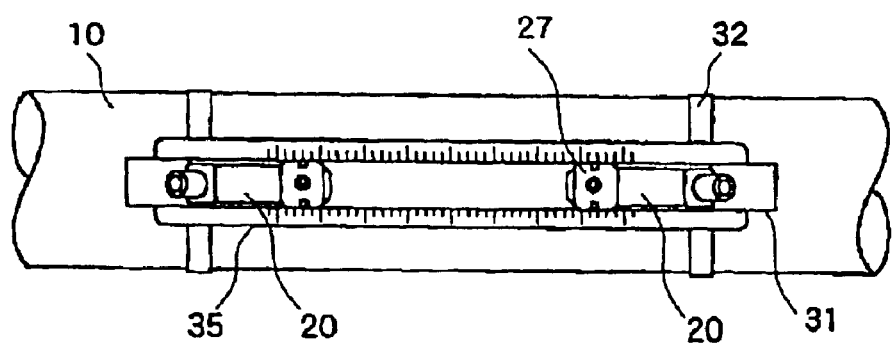
FIG. 11 is a bottom view of the ultrasonic flow amount measuring device shown in FIG. 10.
Figure 12:
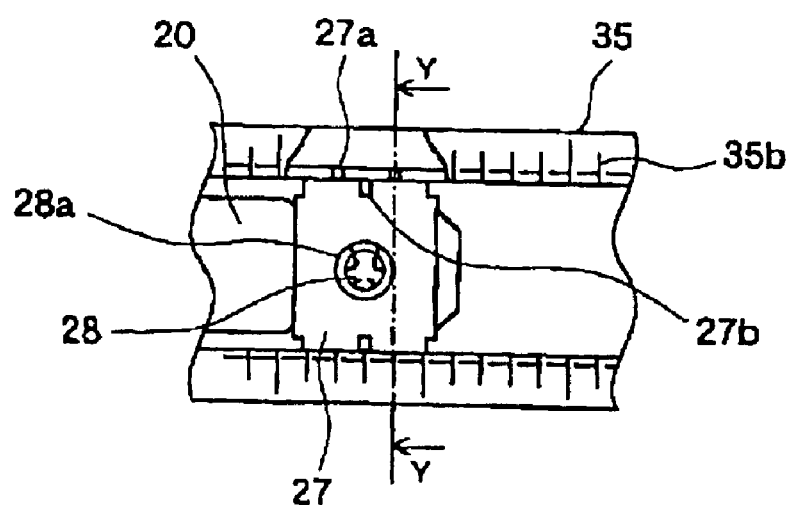
FIG. 12 is an enlarged view showing a detail around a positioning shaft of a transducer shown in FIG. 11.
Figure 13:
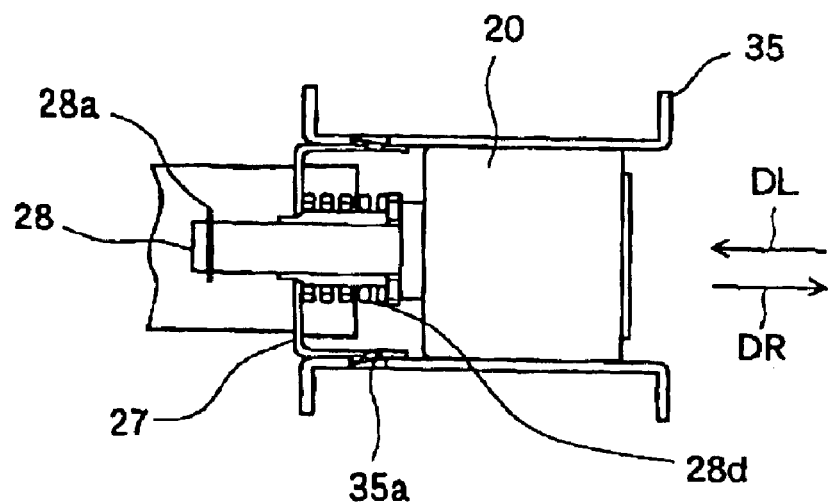
FIG. 13 is a sectional view taken along line Y—Y in FIG. 12.
Figure 14:
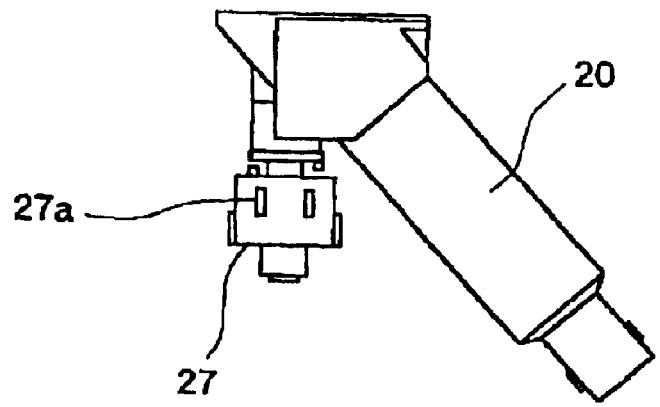
FIG. 14 is a view showing the transducer in a sub-assembly state before the transducer is installed as shown in FIG. 10.
Figure 15:
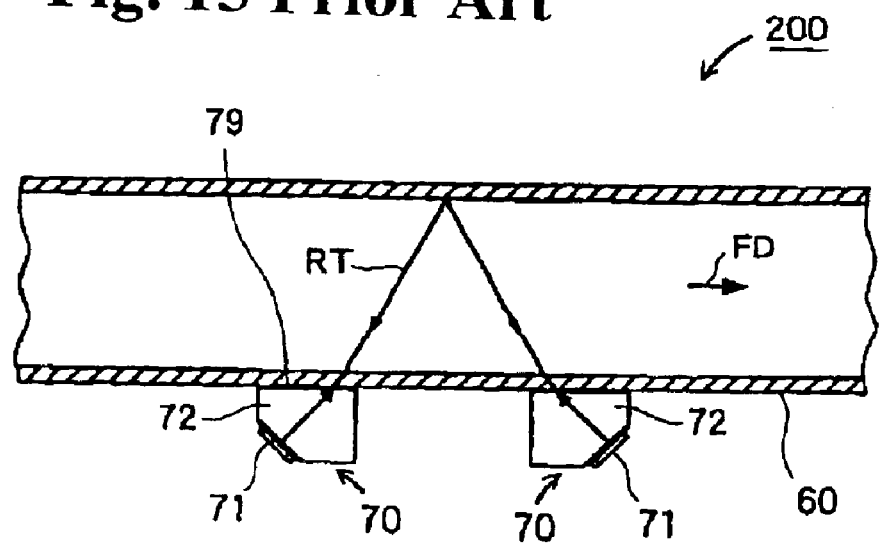
FIG. 15 is a view for explaining the principle of the ultrasonic flow amount measuring device.
Figure 16:
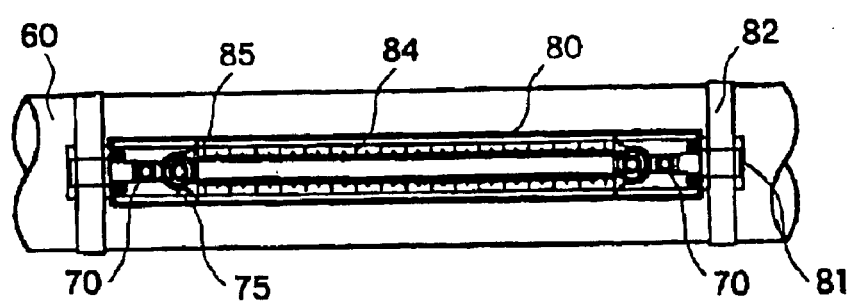
FIG. 16 is a plan view showing a conventional ultrasonic flow amount measuring device.
Figure 17:
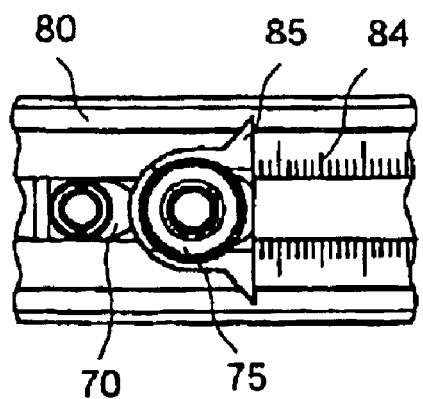
FIG. 17 is an enlarged view showing a transducer and vicinity thereof shown in FIG. 16.
Figure 18:
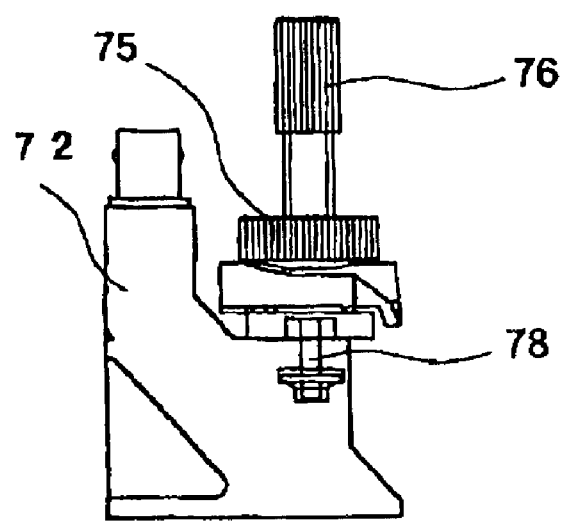
FIG. 18 is a front view showing a detailed structure shown in FIG. 17.

An ultrasonic flow amount measuring device according to an embodiment 3 of the present invention will be described next with reference to FIGS. 10 to 14. FIG. 10 is a front view showing the ultrasonic flow amount measuring device according to the embodiment 3. FIG. 11 is a bottom view of the ultrasonic flow amount measuring device shown in FIG. 10. FIG. 12 is an enlarged view showing a detail around a positioning shaft of a transducer shown in FIG. 11. FIG. 13 is a sectional view taken along line Y—Y in FIG. 12. FIG. 14 is a view showing the transducer in a sub-assembly state before the transducer is installed as shown in FIG. 10.

The ultrasonic flow amount measuring device 103 shown in FIGS. 10 and 11 basically has the same construction as those of the ultrasonic flow amount measuring devices 101 and 102 described above. The ultrasonic flow amount measuring device 103 has a different fixing mechanism for the ultrasonic transducers 20. The ultrasonic flow amount measuring device 103 has a guide frame 35 having plural positioning holes 35a formed in a row on side surfaces thereof. A coil spring 28d and a positioning metal fitting 27 are mounted on the positioning shaft 28 of each of the ultrasonic transducers 20, and are fixed with an E ring 28a so as not to come out of the positioning shaft 28.

The ultrasonic transducers 20, the coil springs 28d and the positioning metal fittings 27 described above are assembled in advance as shown in FIG. 14. In this case, the positioning metal fitting 27 is preferably formed of a plate member having elasticity. The assembly shown in FIG. 14 is inserted into the guide frame 35. In this case, positioning projections 27a of the positioning metal fitting 27 are fitted in the positioning holes 35a of the guide frame 35 (see FIGS. 12, 13, and 14), and the positioning metal fitting 27 is attached to the guide frame 35 as shown in FIGS. 10 and 11. In order to fit easily the positioning projections 27a into the proper positioning holes 35a, slits 27b are formed in the positioning metal fitting 27, and graduations 35b are formed on an upper portion of the guide frame 35. When the components are assembled, the acoustic coupling medium 29 is coated on the bottom surfaces of the ultrasonic transducers 20.

In the assembled state as described above, the transceivers 20 are freely movable in the guide frame 35 in the arrow directions DL and DR shown in FIG. 13. Accordingly, when the transceivers 20 in the assembled state as shown in FIG. 14 are installed in the guide frame 35, the coil springs 28d press the transceivers 20 in the arrow direction DR, and the bottom surfaces of the transceivers 20 elastically abut against the conduit pipe 10. Accordingly, it is possible to attach the transceivers 20 to the guide frame 35 through one-touch operation, and it is easy to detach the transceivers 20 from the guide frame 35. Similar to the ultrasonic flow amount measuring devices 101 and 102, the assemble work can be divided to achieve the advantages described above.

INDUSTRIAL APPLICABILITY

According to the present invention, the ultrasonic flow amount measuring device is assembled as described above. Therefore, it is possible to position the ultrasonic transducers with a specific interval, and automatically fix the ultrasonic transducers at the right position with the right direction. Furthermore, the guide frame is attached to the conduit pipe in one step, and the ultrasonic transducers are attached to the positioning frame in another step, thereby improving the operation efficiency. For example, it is not necessary to coat the acoustic coupling medium on the conduit pipe when the guide frame is attached to the conduit pipe. Therefore, it is possible to freely move and position the guide frame at a desired position. Furthermore, when the ultrasonic transducers are attached, they are positioned through the positioning springs and the positioning holes, so that the positioning of the ultrasonic transducers can be easily performed. When the positioning means having the positioning projection is used, it is possible to attach the ultrasonic transducers to the guide frame through one-touch operation, thereby making the assembly process efficient.

What is claimed is:

1. An ultrasonic flow amount measuring device, comprising:
   a pair of ultrasonic transducers to be disposed on an outer surface of a conduit pipe, through which fluid flows in one direction, at upstream and downstream sides thereof in a flowing direction so that an ultrasonic wave transmitted from one of the ultrasonic transducers is reflected at an inner surface of the conduit pipe and is received by the other of the ultrasonic transducers, and a propagation plane including a propagation path of the ultrasonic wave includes an axis line of the conduit pipe, and
   a positioning mechanism for positioning the ultrasonic transducers at positions with a desired interval so that the ultrasonic transducers are disposed at correct positions and directions, said positioning mechanism including a guide frame to be attached to the outer surface of the conduit pipe for linearly guiding the ultrasonic transducers in an axis direction of the conduit pipe, and spring members, each being disposed between one ultrasonic transducer and the guide frame for elastically pressing the one ultrasonic transducer against the outer surface of the conduit pipe.

2. An ultrasonic flow amount measuring device according to claim 1, wherein said positioning mechanism further includes:

a positioning frame attached to the guide frame and having an outer edge with a saw-teeth shape parallel to the axial line, and positioning means attached to the ultrasonic transducers and having positioning springs, tips of said positioning springs engaging proper portions of the saw-teeth shape of the positioning frame so that the ultrasonic transducers are fixed at the correct positions and directions.

3. An ultrasonic flow amount measuring device according to claim 1, wherein said positioning mechanism further includes:

a positioning portion integrated with the guide frame and having positioning holes with a predetermined interval parallel to the axial line, and positioning means for fixing the ultrasonic transducers to the guide frame at desired positions using the positioning holes so that the ultrasonic transducers are fixed at the correct positions and directions.

4. An ultrasonic flow amount measuring device according to claim 1, wherein said positioning mechanism further includes:

plural positioning holes formed on a side of the guide frame, and positioning means attached to the ultrasonic transducers and having positioning projections, said positioning projections being inserted into proper position holes when the ultrasonic transducers are attached to the guide frame so that the ultrasonic transducers are fixed at the correct positions and directions.

5. An ultrasonic flow amount measuring device according to claim 1, wherein said ultrasonic transducers further include positioning shafts, each of said spring members being disposed around each of the positioning shafts for pressing the one ultrasonic transducer against the outer surface of the conduit pipe.

6. An ultrasonic flow amount measuring device according to claim 2, wherein said positioning means further includes two pairs of fixing plates for holding the guide frame therebetween, each of said positioning springs being disposed between the fixing plates in each pair.

7. An ultrasonic flow amount measuring device according to claim 6, wherein said fixing plates in each pair have center holes for receiving a positioning shaft of the ultrasonic transducer, each of said spring members being disposed around the positioning shaft.

8. An ultrasonic flow amount measuring device according to claim 3, wherein said positioning portion includes two guide portions extending along the conduit pipe and having a space in between, each of the guide portions having the positioning holes, said positioning means being disposed in the space and having pin holes on two sides thereof so that pins are inserted in the positioning holes through the pin holes at the two sides of the positioning means.

9. An ultrasonic flow amount measuring device according to claim 8, wherein said positioning means has center holes for receiving a positioning shaft of the ultrasonic transducer, each of said spring members being disposed around the positioning shaft.

10. An ultrasonic flow amount measuring device according to claim 4, wherein said guide frame includes two graduations extending along the conduit pipe and having a space in between, each of the graduations having the plural positioning holes, said positioning means being disposed in the space and having the projections on two sides thereof so that the projections are inserted in the plural positioning holes at the two sides of the positioning means.

11. An ultrasonic flow amount measuring device according to claim 10, wherein said positioning means has center holes for receiving a positioning shaft of the ultrasonic transducer, each of said spring members being disposed around the positioning shaft.

* * * * *